Patented Nov. 1, 1932

1,885,393

UNITED STATES PATENT OFFICE

ROBERT H. VAN SCHAACK, JR., OF EVANSTON, ILLINOIS, ASSIGNOR TO VAN SCHAACK BROS. CHEMICAL WORKS, INC., OF CHICAGO, ILLINOIS, A CORPORATION OF ILLINOIS

PROCESS OF DRYING LIQUIDS BY DIALYSIS

No Drawing.   Application filed April 29, 1929. Serial No. 359,165.

This invention relates to a new and useful process of drying liquids by dialysis. More particularly, it relates to a process comprising the passage of water from the liquid to be dried, through a semi-permeable membrane, and into a liquid that receives and dilutes the water. It is especially adapted to the drying of organic liquids, as, for example, ethyl or butyl acetate or ethanol.

An example of the invention is the drying of a wet ethyl acetate by allowing the ester to stand or flow along one side of a membrane on the other side of which is alcohol. The membrane is one that is readily wetted or permeated by water but is not readily permeable to either ethyl acetate or alcohol.

Membranes which I have used consist of one of the following: animal parchment, thin cellophane sheeting, or a gelatin film, suitably formed by saturating a finely woven cotton cloth with a hot, concentrated solution of gelatin in water, stretching the cloth, and fixing, while still warm, in position in the dialysis apparatus. The gelatin sets to a hard film on cooling. In some cases, the gelatin film on cloth has been further hardened by treatment with a solution of formaldehyde.

Specific illustrations of methods of practising my invention follow.

Example 1

A one inch layer of a wet ethyl acetate mixture is introduced into a bell-shaped, glass dialyzer the upper end of which is open and the lower end of which has been tightly closed by tieing over it a piece of animal parchment. The dialyzer with its contained ethyl acetate is then partly immersed in 92% alcohol contained in a glass battery jar, the immersion being made to such a depth that the elevation of the alcohol, outside the dialyzer, is approximately the same as the level of ethyl acetate inside the dialyzer. The weight of alcohol used is approximately 125% of the ethyl acetate.

Dialysis ensues at once. The following analyses show the effect of this dialysis in removing water from the ethyl acetate.

| Duration of dialysis | Analysis of ethyl acetate inside the dialyzer | | |
|---|---|---|---|
| Hours after start | % Est. calc. as et. acet. | % Alc. (approx.) | % Water (approx.) |
| 0 | 72.8 | 15.6 | 11.6 |
| 1 | 73.0 | 17.2 | 9.8 |
| 3 | 74.4 | 18.2 | 7.4 |
| 6 | 75.5 | 20.1 | 4.4 |

The alcohol recovered from the outer compartment contained less than 10% of ethyl acetate.

Example 2

The procedure here was the same as in Example 1, except that a gelatin membrane was substituted for the animal parchment. Cloth, of the type commonly used on airplane wings, was dipped in hot, concentrated gelatin solution. The cloth saturated with the gelatin solution was then tied tightly over the bottom of the dialyzer, and allowed to cool overnight before use. During this cooling, the gelatin set to a firm film. The cloth constituted an additional support.

Example 3

The procedure again was the same as in Example 1, except that the alcohol around the dialyzer, in the outer compartment, was changed at intervals.

Example 4

A continuous process was used.

Narrow, circular vessels, shaped and also constructed somewhat like the leaves of a Sweetland pressure filter but with oppositely placed connections for admitting and withdrawing liquids, were tightly covered on both faces with thin cellophane sheeting. These units were tested with liquid to prove the absence of leaks. Three such units were then connected in series and immersed, to the top of the diaphragm, in alcohol contained in a corresponding series of three narrow tanks, connected also in series. Wet ethyl acetate containing dissolved water was then passed through the units carrying the cellophane membrane. Denatured alcohol of 92% concentration, was passed, counter-currently, through the outer series of tanks.

The amount of ethyl alcohol passed through was approximately one half of the amount of ethyl acetate passed. The rate of passage of the ester was such that the average length of time that a given portion was in the apparatus was 6 hours.

Example 5

The procedure of Example 4 was used, except that 92% alcohol was substituted for the ethyl acetate solution and U. S. P. glycerine was substituted for the alcohol used in Experiment 4.

Example 6

The procedure was like that of Experiment 4, except that a wet solution comprising 74.4% butyl acetate and butanol and water was passed through the discs carrying the cellophane membranes and dry butanol was passed, counter-currently, through the tanks in which the discs were placed.

Example 7

The procedure was again like that of Example 4 except that an emulsion, comprising equal weights of lard oil and of a 1% solution of soap in water, was substituted for the ethyl acetate solution. Other emulsions, particularly those having water as the external phase, may be submitted to dialysis in this manner. An example is an emulsion of petroleum in soapy water.

Many variations from the details of the examples may be made without departing from the spirit of the invention. Thus, there may be used a different temperature than atmospheric. A temperature below atmospheric as, for example, 0° C. may be used or some temperature above atmospheric as, for example, 30 to 75° C.

An electric potential may be applied to electrodes placed on opposite sides of the membrane. Thus I may use, for example, a potential difference of 6 to 60 volts, direct current, between two flat electrodes of copper wire placed directly against an animal parchment membrane, on either side.

It will be understood that a liquid which has been dried partly, but not completely, by the process of this invention may be submitted to an additional drying operation to complete the drying. Thus, the ethyl acetate solution that has been partly dried, as illustrated in any one of the examples above, may be treated with a small amount of commercial calcium chloride, preferably in several portions, separated from the calcium chloride by pouring off, and then distilled. Or, other known processes of drying may be used to supplement the dialysis.

Various strengths of alcohol may be used on the one side of the membrane to receive the water which passes through the membrane from the wet liquid on the other side. Thus, I have used ethyl alcohol of 87% concentration, by weight, or higher, as, for example, 92%.

When ethyl acetate solution is to be dried, it may contain, besides water, various amounts of other substances, as for example, ethyl propionate, ethyl butyrate and alcohol. In the table of analytical data given above, it will be seen that the ethyl acetate solution dialyzed in Example 1 contained initially 72.8% ester, approximately 15.6% alcohol, and approximately 11.6% water. There may also be used to advantage mixtures containing a higher percentage of ester, as, for example, 83% or 93% ester, with lower percentages of alcohol and water, necessarily, than those shown above.

I claim:

1. The process of dehydrating an organic liquid containing water which comprises the step of allowing water to pass from its solution in the liquid, through a semi-permeable membrane, and into another organic liquid that is hygroscopic.

2. The process of dehydrating an organic liquid containing water which comprises the step of allowing water to pass from its solution in the liquid, through a semi-permeable membrane of organic material, and into another organic liquid that is hygroscopic.

3. The process of dehydrating an organic liquid containing water which comprises the step of allowing water to pass from its solution in the liquid, through a gelatin film, and into another organic liquid that is hygroscopic.

4. The process of dehydrating an organic liquid containing water which comprises the step of allowing water to pass from its solution in the liquid, through a semi-permeable membrane consisting of a cloth impregnated with a continuous gelatin film, and into another liquid that is hygroscopic.

5. In the removal of water from its solution in an organic liquid, the step which comprises bringing the solution into contact with a semi-permeable membrane on the other side of which membrane is another liquid in which water is soluble in a substantial proportion said liquid being less concentrated with respect to dissolved water than the material being dehydrated.

6. The process of removing water from an ethyl acetate solution containing water which comprises the step of allowing water to pass from its solution in the ethyl acetate, through a semi-permeable membrane, and into a liquid in which water is soluble said liquid being less concentrated with respect to dissolved water than the material being dehydrated.

7. The process of removing water from an ethyl acetate solution containing water which comprises the step of allowing water to pass from its solution in the ethyl acetate, through a gelatin film, and into a liquid in which water is soluble said liquid being less concentrated with respect to dissolved water than the material being dehydrated.

8. The process of removing water from an ethyl acetate solution containing water which comprises the step of allowing water to pass from its solution in the ethyl acetate, through a gelatin film supported on cloth, and into a liquid in which water is soluble said liquid being less concentrated with respect to dissolved water than the material being dehydrated.

9. The process of removing water from its solution in ethyl acetate which comprises the step of causing the wet ester to flow along one side of a semi-permeable membrane along the other side of which there is flowing ethyl alcohol.

10. The process of removing water from its solution in ethyl acetate which comprises the step of causing the wet ester to flow along one side of a semi-permeable membrane along the other side of which there is flowing ethyl alcohol of concentration equal to at least 87% of ethanol by weight.

11. In the drying of an ester, the step which comprises removal of water by dialysis, from the ester and dissolving of that water by an alcohol, on the other side of the dialyzing membrane.

12. The process of dehydration which comprises the step of allowing water to pass from a composition containing it and an organic liquid into another liquid that is capable of taking up water, the two liquids being separated by a semi-permeable membrane through which water may pass readily.

13. In the drying of an ester containing dissolved water, the step which comprises the removal of water by dialysis from the ester and dissolving the water by an alcohol on the other side of a membrane which is reltively impermeable to ester and alcohol and relatively permeable to water.

14. In the drying of a hydrous ethyl acetate solution comprising more than 72 parts by weight of ethyl acetate in 100 parts of total solution, the step which comprises the removal of water by dialysis from the ester and dissolving the water by an alcohol on the other side of a membrane which is relatively impermeaable to ester and alcohol and relatively permeable to water.

15. In the drying of a hydrous ethyl acetate solution comprising more than 90 parts by weight of ethyl acetate in 100 parts of total solution, the step which comprises the removal of water by dialysis from the ester and dissolving the water by an alcohol on the other side of a membrane which is relatively impermeable to ester and alcohol and relatively permeable to water.

R. H. VAN SCHAACK, Jr.